United States Patent
Freiburger

(10) Patent No.: US 6,814,333 B1
(45) Date of Patent: Nov. 9, 2004

(54) COLLAPSIBLE COOLER STAND

(76) Inventor: Debra J. Freiburger, 7804 Arcola Rd., Fort Wayne, IN (US) 46818

( * ) Notice: Subject to any disclaimer, the term of this patent is extended or adjusted under 35 U.S.C. 154(b) by 0 days.

(21) Appl. No.: 10/437,150

(22) Filed: May 13, 2003

Related U.S. Application Data

(60) Provisional application No. 60/380,374, filed on May 14, 2002.

(51) Int. Cl.[7] .............................................. A47G 23/02
(52) U.S. Cl. ........................ 248/150; 248/164; 248/166
(58) Field of Search ................................ 248/150, 164, 248/166; 297/16.2; 280/639, 640, 37; 108/115, 118, 125, 128

(56) References Cited

U.S. PATENT DOCUMENTS

| | | | | |
|---|---|---|---|---|
| 2,254,939 A | * | 9/1941 | Thias | 248/150 |
| 2,522,096 A | * | 9/1950 | Cooke | 248/166 |
| 3,013,757 A | * | 12/1961 | Brammer | 248/150 |
| 3,235,038 A | * | 2/1966 | Nesslinger | 182/62.5 |
| 3,740,880 A | * | 6/1973 | Sweet et al. | 40/610 |
| 4,715,650 A | | 12/1987 | Berman et al. | |
| 5,190,254 A | * | 3/1993 | Maguire | 248/164 |
| 5,645,259 A | * | 7/1997 | Chen | 248/436 |
| 6,053,459 A | | 4/2000 | Priefert et al. | |
| 6,073,894 A | * | 6/2000 | Chen | 248/165 |
| 6,082,813 A | * | 7/2000 | Chen | 297/16.2 |
| D448,625 S | * | 10/2001 | Moffett et al. | D7/605 |
| 6,322,138 B1 | | 11/2001 | Tang | |

* cited by examiner

Primary Examiner—Korie Chan

(57) ABSTRACT

The invention provides a portable cooler stand having a collapsed or folded configuration for transportation and an unfolded configuration for supporting cooler off the ground within easy reach of users. The stand has four support legs. The legs are positionable roughly at the corners of a rectangle, with each support leg is linked to two adjacent support legs by a pair of folding positioning members. Two parallel load bars are pivotally connected to two adjacent support legs and may be extended to attach temporarily to the remaining two support legs to fix the length of the support cooler in its unfolded condition. One or more flexible belts are connected between the load bars to support a cooler or similar bulky object between the load bars. Under the weight of the cooler the load bars move toward one another until they contact the cooler, which fixes the width of the stand and completes the structure's rigidity.

4 Claims, 4 Drawing Sheets

US 6,814,333 B1

COLLAPSIBLE COOLER STAND

REFERENCE TO RELATED APPLICATION

This application claims the benefit of U.S. Provisional Application No. 60/380,374 filed 14 May 2002.

BACKGROUND OF THE INVENTION

1. Field of the Invention

The present invention relates to portable, collapsible, outdoor furniture, and more particularly relates to a collapsible stand usable for securely supporting a portable cooler or other bulky object.

2. Description of the Problem

Portable coolers for the stowage and transport of beverages enjoy great popularity. Anyone attending a picnic or sporting event "tail-gate" party is familiar with these coolers, typically laid on the ground and filled with ice, beverages and other items requiring refrigeration. Users of these coolers just as quickly become familiar with the discomfort of crouching or bending over to retrieve items from the coolers, particularly if the items are buried in ice. It would be desirable to provide a means of raising such coolers to about waist height for the convenience of picnickers.

SUMMARY OF THE INVENTION

The invention provides a portable cooler stand having a collapsed or folded configuration for transportation and an unfolded configuration for supporting a cooler off the ground within easy reach of users. The stand has four support legs. The legs are positionable roughly at the corners of a rectangle, with each support leg linked to two adjacent support legs by a pair of folding struts. Two parallel load bars are pivotally connected to two adjacent support legs and may be extended to attach temporarily to the remaining two support legs to fix the length of the support cooler in its unfolded condition. One or more flexible belts are connected between the load bars to support a cooler or similar bulky object between the load bars. Under the weight of the cooler the load bars move toward one another until they contact the cooler, which fixes the width of the stand and complements the structure's rigidity. The folding struts are jointed, and are attached at each of two ends to a support member using a pivot connection. The stand support legs and load bars may be fabricated from aluminum tubes, and capped to improve presentability.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
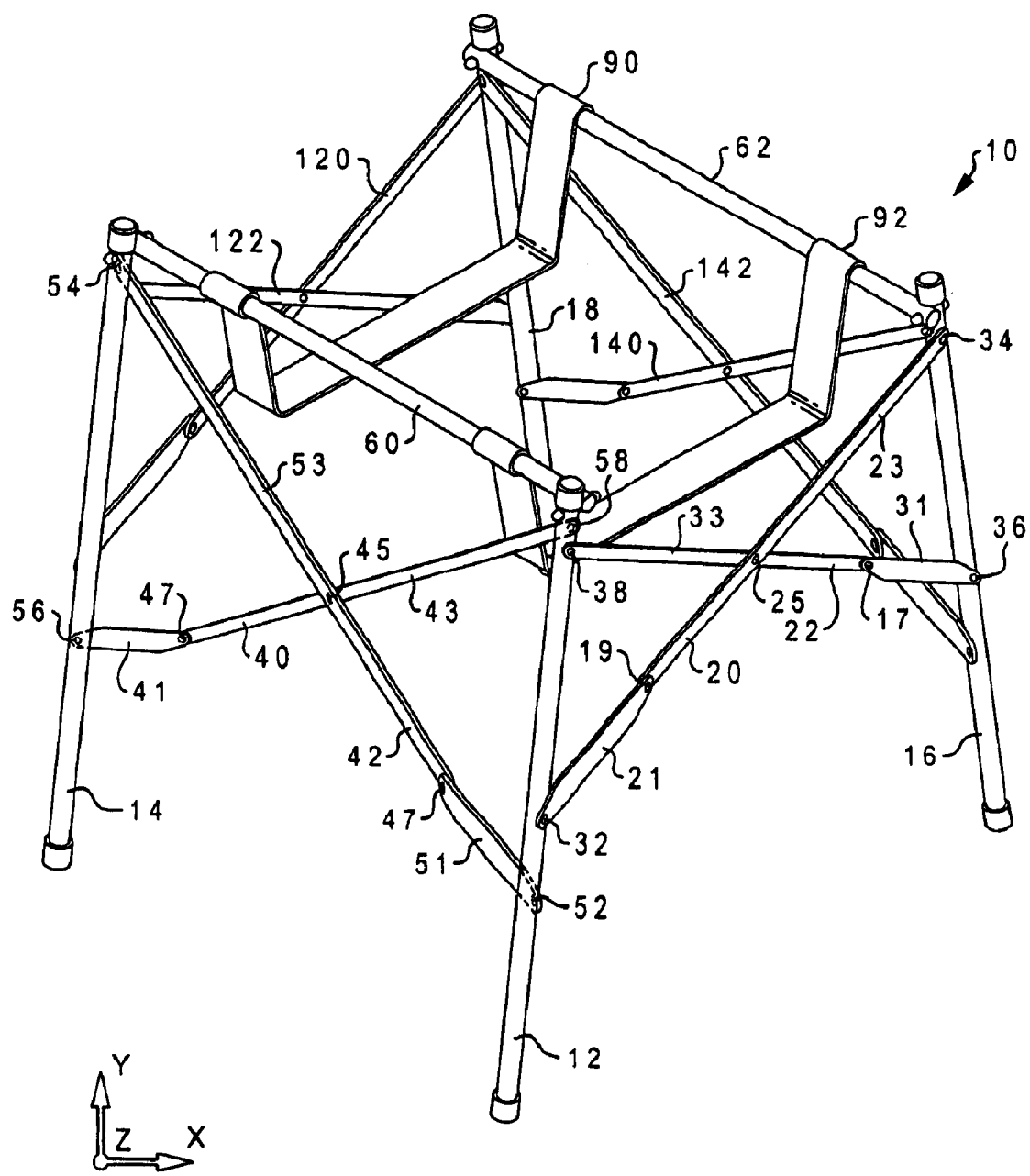
FIG. 1 is a perspective view of a cooler stand in accordance with the invention in an unfolded state.

Referring now to the figures, a cooler stand 10 in accordance with the invention is depicted. Cooler stand 10 has four support legs 12, 14, 16 and 18, with legs 12 and 14 positioned at a front of the stand and legs 16 and 18 at the rear. Legs 12, 14, 16 and 18 are arranged roughly at the corners of a rectangle, with legs 12 and 14 canted at the top toward the back of the stand and legs 16 and 18 canted at the top toward the front of the stand when stand 10 is unfolded. Legs 12 and 14 are parallel one to another and legs 16 and 18 are also parallel to one another. Legs are referred to as being adjacent to one another when they are located at adjacent corners of an imaginary rectangle. Thus each leg has two adjacent legs and one opposite leg. For example, leg 12 has adjacent legs 14 and 16 and opposite leg 18.

Eight folding positioning members 20, 22, 40, 42, 120, 122, 140 and 142 or struts guide support legs 12, 14, 16 and 18 to the desired positions for use of the stand when the stand is unfolded as shown in FIGS. 1, 3A–C and 4. The positioning members 20, 22, 40, 42, 120, 122, 140 and 142 are arranged in crossed pairs between adjacent legs, for example, the pair of positioning members 40 and 42 between support legs 12 and 14. Positioning members 40 and 42 are pivotally connected where they cross as described below. The pair of positioning members 40 and 42 between legs 12 and 14 are identical to the opposite pair of positioning members 140, 142 between legs 16 and 18. Similarly positioning members 20 and 22 between legs 12 and 16 are identical to the opposite pair of positioning members 120, 122 between legs 14 and 18. Accordingly, only the pairs of positioning members having an attachment to support leg 12 are discussed, it being understood that the remaining positioning members having attachment to the opposite leg 18 include corresponding parts, and function in substantially the same manner. Indeed one of the few differences between the pair of positioning members including positioning members 20 and 22 and the pair including positioning members 40 and 42 is in the relative location of a joint between the members of each pair, which in the case of positioning members 20 and 22 causes the legs 12 and 16 to expand to positions where the legs are inwardly canted toward one another from bottom to top, and in the case of members 40 and 42 results in the legs remaining parallel to one another when support 10 is unfolded. In addition, the positioning members (20, 22, 120, 122) connected from front to back of stand 10 are somewhat shorter than the members (40, 42, 140, 142) connected side to side where stand 10 is intended for use with a rectangular cooler 100.

The inward cant in the adjacent legs from front to back of stand 10 is obtained in its unfolded state by the pairs of positioning members arranged between adjacent pairs of legs 12 and 16, and 14 and 18, being linked at a pivoting joint 25 which is off center relative to the two positioning members 20 and 22 of the pair. Positioning members 20 and 22 are connected between support legs 12 and 16, with member 20 being connected by a pivot joint 32 at one end to a mid to lower part of support leg 12 and at its remaining end by a pivot joint 34 near the top of support leg 16. Positioning member 22 is similarly connected between legs 16 and 12 with one end of the member being attached by a pivot joint 36 to the mid to lower portion of leg 16 and the remaining end attached near the top of leg 12 at pivot 38.

Positioning members 20 and 22 are segmented to allow the members to fold for compaction of stand 10. Member 20 comprises a lower segment 21 and an upper segment 23, which are joined at adjacent ends at a pivot joint 19. Lower segment 21 is connected at one end to pivot joint 32. Upper segment 23 is attached to leg 16 at pivot joint 34. Member 22 comprises a lower segment 31 and an upper segment 33, which are joined at adjacent ends at a pivot 17. Lower segment 31 is connected at one end to pivot joint 36 to leg 16. Upper segment 33 is attached to leg 12 at pivot joint 34. Joint 25 is provided between the respective upper segments 23 and 33 at a point which assures that the greater part of the length of the positioning members 20 and 22 falls between the joint and the lower points of connection to the legs 12 and 16, respectively, pushing out the lower portions of the legs when the stand is unfolded relative to the upper portions of the legs. Segmentation of the positioning members allow the members to be folded for compaction of the structure. Alternatively, positioning members could be attached at one end to one each of the legs using a sliding joint, but such an arrangement would likely prove more complex and expensive, and less reliable than the method illustrated. Positioning members 20 and 22 are attached to the outside of legs 12 and 16, so that when the structure is collapsed the positioning members are on the outside portion of the package.

Positioning members are also provided between the front pair of legs 12 and 14 and a back pair of legs 16 and 18. Positioning members 40 and 42, each comprising an upper and lower segment, are connected between legs 12 and 14. Member 40 comprises a lower segment 41 and an upper segment 43, which are joined at adjacent ends at a pivot 47. Lower segment 41 is connected at one end to pivot joint 56 on leg 14. Upper segment 43 is attached to leg 12 at pivot joint 58. Member 42 comprises a lower segment 51 and an upper segment 53, which are joined at adjacent ends at a pivot 49. Lower segment 51 is connected at one end to pivot joint 52 to leg 12. Upper segment 53 is attached to leg 14 at pivot joint 54. Joint 45 is provided between the respective upper segments 43 and 53 at a point which assures that the length of the positioning members 40 and 42, when extended, is equally divided by the joint, with the result that legs 12 and 14 extend to parallel positions when the stand is unfolded. Positioning members 40 and 42 are attached to the inside of legs 12 and 14.

Side to side bracing of the support 10 is provided by load arms 60 and 62. Load arms 60 and 62 are pivotally connected at one end each to the top of support legs 14 and 18, respectively, and temporarily attach at their opposite ends to the top portion of legs 12 and 16 to brace the structure from side to side. For compaction, load arms 60 and 62 are detached from legs 12 and 16, respectively, and folded downwardly, adjacent and parallel to legs 14 and 18. Support 10 may then be compacted by collapsing adjacent legs on one another. Flexible straps 90 and 92 are connected from front to back of stand 10 on load arms 60 and 62 to support a cooler 100 (see FIG. 4) Introduction of a cooler 100 will draw load arms 60 and 62 inwardly into contact with the cooler bracing the stand 10 from front to back.

Figure 2:
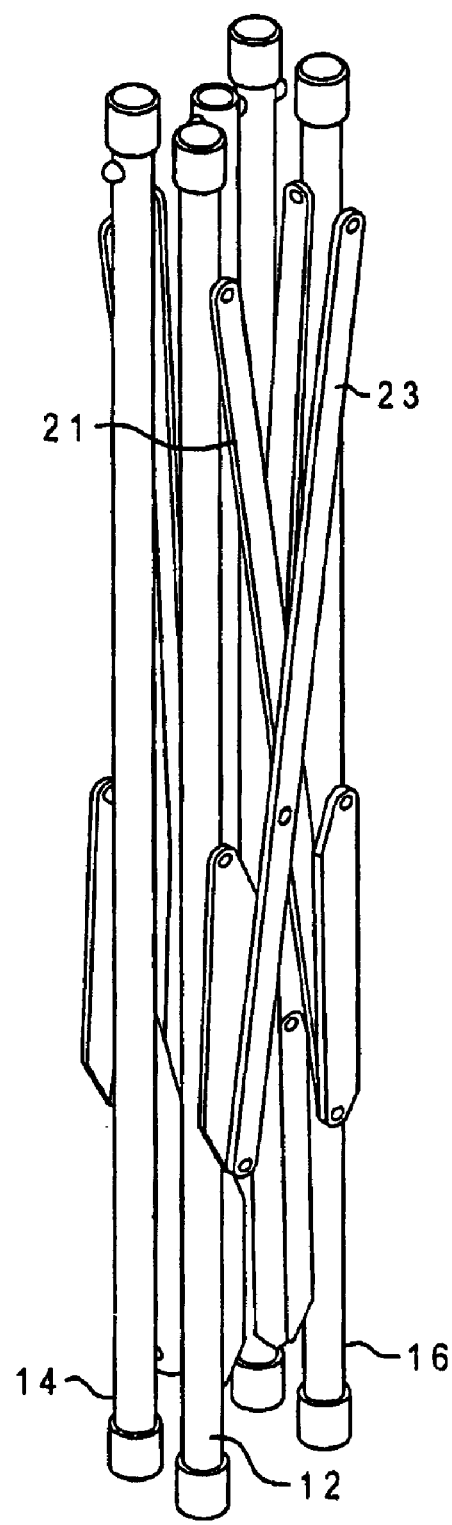
FIG. 2 is a perspective view of the portable cooler stand in a folded state.
Figure 3A:
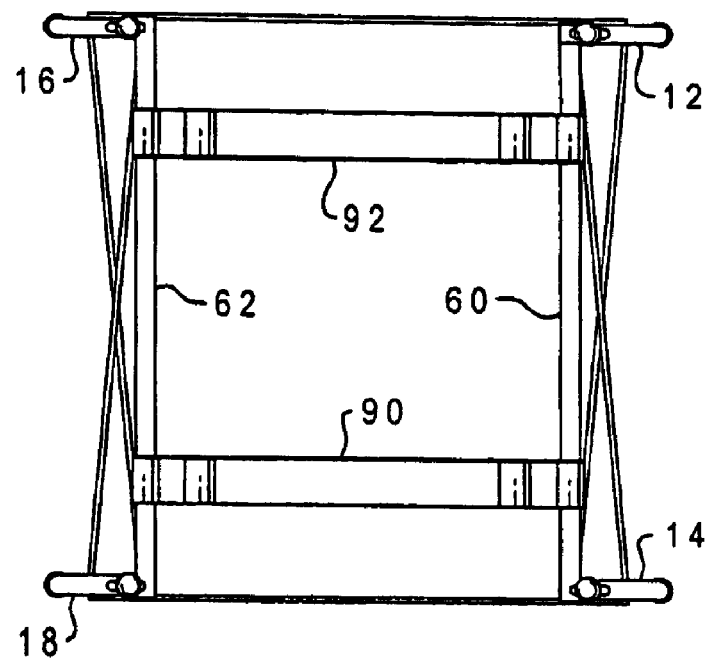
FIG. 3A is a top plan view.
Figure 3B:
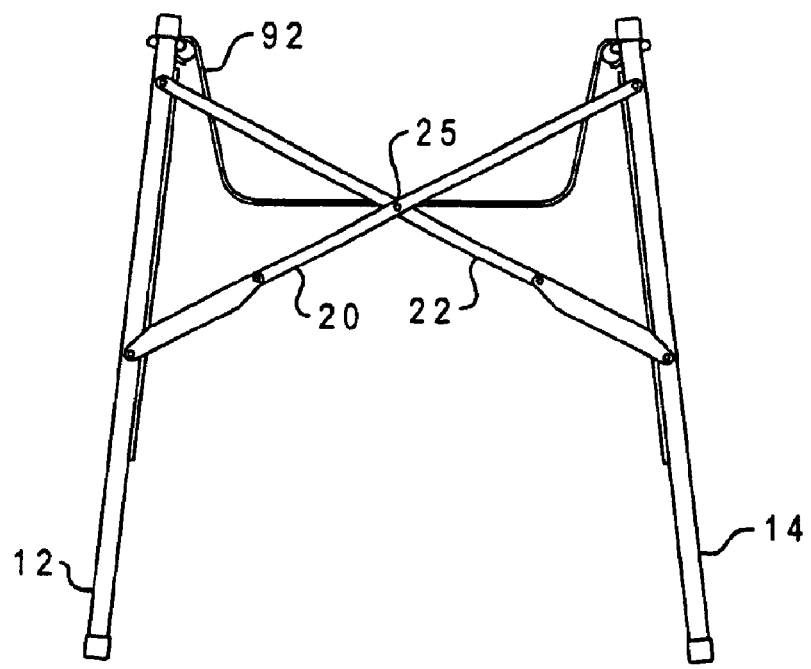
FIG. 3B is an end elevation.
Figure 3C:
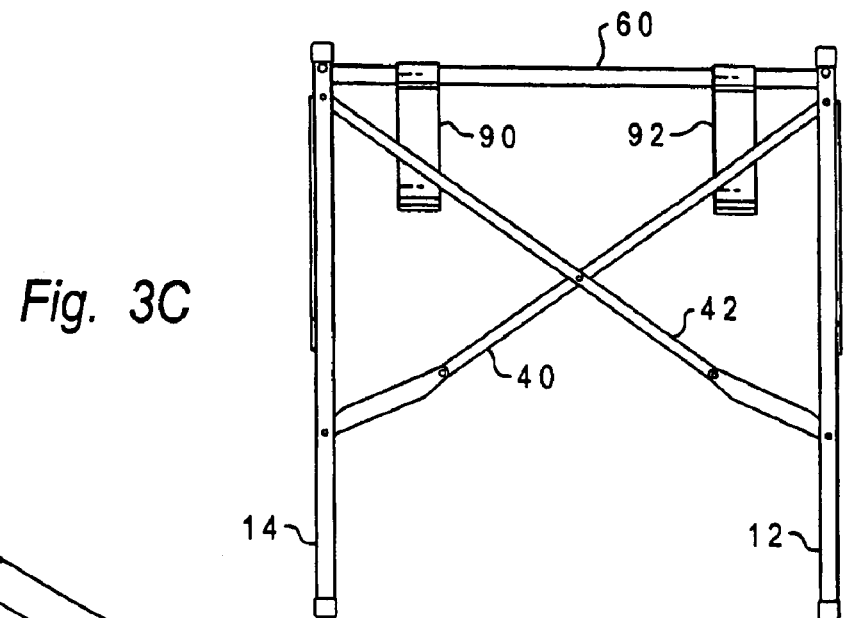
FIG. 3C is a front elevation.
Figure 4:
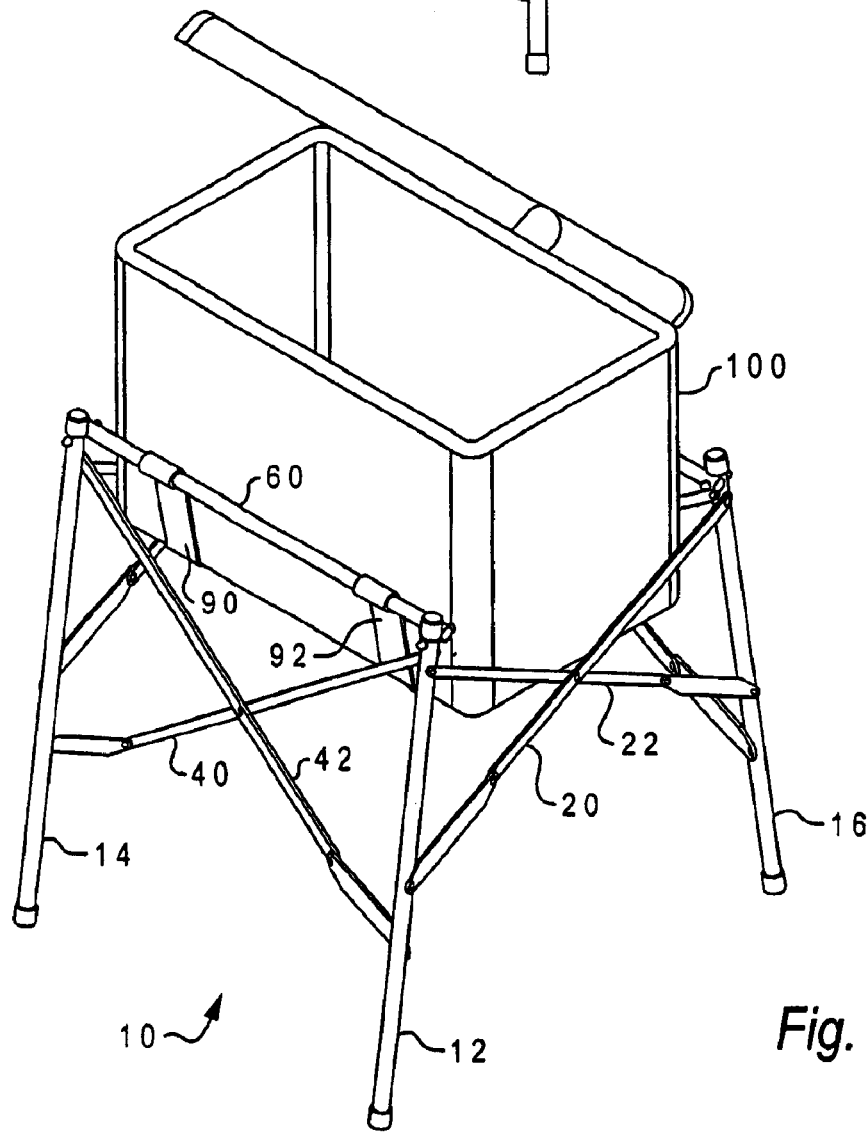
FIG. 4 is a perspective view of the stand with a cooler.

FIG. 2 is a perspective view of the portable cooler stand in a folded state, with legs 12, 14, 16 and 18, and load arms 60 and 62 all lying in a compressed, closely adjacent parallel positions. Load arms 60 and 62 are inside the package as are positioning members 40, 42, 140, 142. Positioning members 20, 22, 120, 122 are outside of the collapsed package.

The invention meets the need for a sturdy, yet light weight, portable cooler stand which can accommodate coolers of differing sizes. Additionally, the stand becomes sturdier with increasing weight of the cooler up to the failure weight on the components.

While the invention is shown in only one of its forms, it is not thus limited but is susceptible to various changes and modifications without departing from the spirit and scope of the invention.

What is claimed is:

1. A portable cooler stand comprising:

four support legs expandable to an arrangement where the four support legs are at the approximate corners of a rectangle;

a plurality of four pairs of folding struts attached one pair each between each pair of adjacent support legs, each of the folding struts having a midpoint along a length thereof, the folding struts of each pair of folding struts crossing one another with a pivot joint connecting the folding struts of each pair at the point of crossing, the pivot joints of two pairs of folding struts disposed opposite one another being located off center with respect to the mid-point of each of the folding struts of said two pairs of folding struts and the pivot joints of the remaining two pairs of folding struts being located at the midpoint of the folding struts of said remaining two pairs of folding struts so that when portable cooler stand is expanded the support legs tilt inwardly toward one another at the too of the portable cooler from front to back while remaining parallel from side to side;

first and second parallel braces pivotally connected to two support legs located at adjacent corners and rotatable to attach temporarily, one brace each, to one each of the two remaining support legs across the sides of the portable cooler where the pairs of folding struts are jointed at about their midpoints, to fix a length for the portable cooler stand in its expanded state an unfolded state; and a flexible support connected between the parallel braces;

whereby the parallel braces move toward one another under the influence of the weight of a portable cooler until the braces close on two sides of the portable cooler.

2. A portable cooler stand as set forth in claim 1, further comprising:

pivot joints connecting opposed ends of the folding struts to one each of the support legs; and each folding strut having two elongated members and a pivot joint connecting the elongated members.

3. A portable cooler stand as set forth in claim 2, the flexible support comprising a plurality of belts connected between the braces.

4. Apparatus comprising:

a portable cooler;

four support legs arranged approximately at the corners of a rectangle with two front support legs and two rear support legs;

a pair of folding struts attached between adjacent pairs of support legs each of the folding struts having a midpoint along a length thereof;

the pairs of folding struts attached between front and back support legs crossing one another at a point off center relative to the mid-point of each of the folding struts of said pairs of folding struts attached between front and back support legs;

the pair of folding struts attached between the front support legs crossing one another at a point about the midpoint of each of the folding struts attached between the front support legs and the pair of folding struts attached between the back support legs crossing one another at a point about the midpoint of each of the folding struts attached between the back support legs;

the folding struts of each pair of folding struts being pivotally attached at the point of crossing;

first and second parallel braces pivotally connected, one to a back support lea and one to an adjacent front support leg and rotatable to attach temporarily, one each, to the remaining back and front support legs respectively to fix a length for the portable cooler stand in an expanded state; and a flexible support connected between the braces to support the portable cooler between the parallel braces when the braces are attached to the remaining support legs, the parallel braces moving toward one another under the influence of the weight of the portable cooler until the braces close on two sides of the portable cooler from the front and back.

* * * * *